United States Patent [19]
Crouch et al.

[11] Patent Number: 6,027,078
[45] Date of Patent: Feb. 22, 2000

[54] METHOD AND APPARATUS USING LOCALIZED HEATING FOR LAMINAR FLOW

[75] Inventors: Jeffrey D. Crouch, Issaquah; Lian L. Ng, Bellevue, both of Wash.

[73] Assignee: The Boeing Company, Seattle, Wash.

[21] Appl. No.: 09/032,185

[22] Filed: Feb. 27, 1998

[51] Int. Cl.[7] .................................................. B64C 21/00
[52] U.S. Cl. ........................ 244/204; 244/130; 244/204; 244/53 B
[58] Field of Search ..................................... 244/204, 130, 244/201, 53 B, 134 R, 134 B, 134 D; 60/39.093; 165/415

[56] References Cited

U.S. PATENT DOCUMENTS

| | | |
|---|---|---|
| 2,757,273 | 7/1956 | Taylor . |
| 2,762,897 | 9/1956 | Vrooman et al. . |
| 2,992,317 | 7/1961 | Hoffman . |
| 3,933,327 | 1/1976 | Cook et al. . |
| 4,706,740 | 11/1987 | Mahefkey . |
| 4,738,416 | 4/1988 | Birbragher . |
| 4,786,015 | 11/1988 | Niggemann . |
| 4,799,633 | 1/1989 | Lahti et al. . |
| 4,813,631 | 3/1989 | Gratzer . |
| 5,012,065 | 4/1991 | Rayson et al. . |
| 5,297,765 | 3/1994 | Hughes et al. . |

OTHER PUBLICATIONS

Dovgal, A.V., Levchenko, V.Ya. and Timofeev, V.A., "Boundary Layer Control by a Local Heating of the Wall," *IUTAM Laminar Turbulent Transition*, eds. D. Arnal and R. Michel, Springer–Verlag, 1990, pp. 113–121.

Holmes, B.J., Obara, C.J. and Yip, L.P., "Natural laminar flow, experiments on modern airplane surfaces," NASA Technical Paper 2256 (1984), pp. 1–29.

Elsenaar, A. and Haasnoot, H.N., "A survey on Schiphol airport of the contamination of wing leading edges of three different aircraft types under operating conditions," Proceedings of First European Forum on Laminar Flow Technoloy, pp. 256–261 (1992).

"Laminar flow for subsonic transport aircraft," *Aerospace Engineering*, pp. 21–25 (Jun. 1996).

*Primary Examiner*—Peter M. Poon
*Assistant Examiner*—Tien Dinh
*Attorney, Agent, or Firm*—Christensen O'Connor Johnson & Kindness PLLC

[57] ABSTRACT

A method and apparatus using localized heating to encourage laminar flow along an airfoil exterior surface. The airfoil includes a leading edge (24), a controlled surface (18), and an uncontrolled surface (20). The present invention localized heating system (38) includes a heat source (40) located within the airfoil and connected to the leading edge (24), and a heat sink (42) positioned aft of the heat source (40) and arranged to transfer heat from the airfoil controlled surface (18) to the uncontrolled surface (20). The heat sink (42) preferably expels heat along uncontrolled surface adjacent to turbulent air flow. In one preferred embodiment as applied to a generally circular aircraft engine nacelle (12), the heat source (40) is an electro-thermal heat source (44) having a high resistance wire embedded in a composite material leading edge structure (50), and the heat sink (42) is a heat pipe (52) having a wicking material (58) and a vaporizing agent (60). A method of encouraging laminar flow about a controlled surface of an airfoil is further provided. The method includes heating (61) the outer surface near the leading edge region, drawing (62) heat from a controlled surface downstream of the heated surface, and expelling (63) heat along the an uncontrolled surface.

20 Claims, 2 Drawing Sheets

METHOD AND APPARATUS USING LOCALIZED HEATING FOR LAMINAR FLOW

FIELD OF THE INVENTION

The present invention relates to aircraft boundary-layer flow-control systems, and more specifically, to methods and apparatus for encouraging laminar flow along the surface of an airfoil or body.

BACKGROUND OF THE INVENTION

Laminar flow is achieved by reducing the magnitude of disturbances and instabilities in the boundary-layer. By keeping these fluctuations small, the nonlinear interactions leading to turbulence can be curtailed and/or delayed. Currently, the most robust methods for controlling the disturbance amplitudes are based on modifying the boundary-layer mean flow via airfoil geometry (i.e., by tailoring the pressure gradient, $C_p$) or by applying surface suction.

Since modifications to the pressure gradient do not actively consume power, this approach has been termed "natural laminar flow". The successful application of this approach and attainment of drag reduction benefits has been demonstrated both theoretically and in testing for nominally two-dimensional boundary-layers. The main disadvantage of the natural laminar flow approach is that the modified $C_p$ distribution is generally unacceptable from an overall airplane performance point of view. For this reason, natural laminar flow is not frequently used for increasing the extent of laminar flow.

The use of suction has also been successfully tested to show improved laminar flow and reduced drag without the adverse restrictions on the $C_p$ distribution. However, the suction approach has its own shortcomings, including increased costs, added weight, and increased complexity of the overall flow-control system as compared to the baseline non-suction configuration. These shortcomings partially offset the performance savings. There are also potential performance penalties associated with suction applications, e.g., suction drag and increased roughness sensitivity due to thinner boundary-layers. Additionally, the porous suction surface can require increased maintenance.

It is also known to use a combination of suction and pressure gradient tailoring (termed "hybrid laminar flow control") to effectively achieve laminar flow with more practical $C_p$ distributions. While the overall performance of the aircraft is improved to acceptable levels, the hybrid laminar flow control approach still suffers the shortcomings of the suction system.

The application of surface air cooling (to below the adiabatic surface temperature) has also been theorized to be an effective flow control technique. The general theory predicts that cooling of an airflow surface to lower than the adiabatic surface temperature will cool the passing boundary-layer which in turn will slow the development and growth of instabilities. Conceived surface cooling techniques, however, are thought to be impractical for large surface areas such as those in a large commercial transport. Because of this, the idea of surface cooling is not exploited in current aircraft configurations.

The beneficial effects of surface cooling have also been theorized to occur by application of local heat to a stable upstream region of the boundary-layer. In theory, the heated upstream boundary-layer then encounters a cooler downstream surface to result in a net change in temperature decrease experienced by the boundary-layer that is similar to the net change in temperature achieved by simply cooling the downstream surface. This approach was demonstrated experimentally at TsAGI and at I.T.A.M. in Russia during the mid-to-late 1980's. Specifically, the results showed that increased laminar flow could be achieved by localized heating in the leading-edge region of a flat plate. (See for example, Dovgal, A. V., Levchenko, V. Ya. and Timofeev, V. A. (1990) "Boundary layer control by a local heating of the wall," from: IUTAM Laminar-Turbulent Transition, eds. D. Arnal and R. Michel, Springer-Verlag, pp. 113–121). One of the problems in applying this alternative technique to airfoils has been the loss of performance benefit after only a relatively short period of time due to the transfer of heat from the boundary-layer flow to the cooler surface downstream. As heat is transferred from the boundary-layer flow, the surface temperature rises and the relative temperature difference between the flow and the surface diminishes. This reduces the stabilizing effect on the boundary-layer and eventually terminates the laminar-flow benefit.

In summary, the drag reduction benefits of having laminar airflow have been known for many years, however, there are few economically viable laminar airflow control systems available. The general problem has been that the increased costs required to achieve sustained laminar flow substantially erodes the potential benefits. Usually, the laminar flow control system does improve laminar flow over an aerodynamic surface (e.g., wing, nacelle, vertical tail, etc.) and improve overall aircraft performance, but the benefits of the system are more than offset by the increased costs in manufacturing, maintenance, aircraft weight, design complexity, etc. Thus, a need exists for a laminar flow control means that is low cost and low maintenance. The ideal system would further have minimum impact on the weight and configuration complexity of the aircraft.

SUMMARY OF THE INVENTION

In accordance with aspects of the present invention, a localized heating system is provided for use with an airfoil having a leading edge region, a controlled surface extending aftward from the leading edge on one side of the airfoil, and an uncontrolled surface extending aftward from the leading edge region on the opposite side of the airfoil. The heating system includes a heat source located at the leading edge region; and a heat sink positioned aft of the heat source and adapted for heat transfer from the controlled surface to the uncontrolled surface. The transfer of heat by the heat sink yields a sustained improvement to the boundary-layer airflow along the controlled surface.

In accordance with further aspects of this invention, the airfoil includes a favorable pressure gradient region and the heat source extends within the airfoil over an amount in the range of about 30% to about 80% of the favorable pressure gradient region. In preferred embodiments the leading edge region includes a favorable pressure gradient region and the controlled surface includes an unfavorable pressure gradient region. The heat source is located in the favorable pressure gradient region, and the heat sink is located to include at least portions of the unfavorable pressure gradient region.

In accordance with other aspects of this invention, the heat sink is a heat pipe having a hot region and a cold region. The heat pipe hot region is in communication with the airfoil controlled surface at a location downstream of the heat source. The heat pipe cold region is in communication with the uncontrolled surface, preferably at a location adjacent turbulent air flow. The heat source is an electro-thermal heat source comprising a high resistance material embedded in a composite leading edge structure.

In accordance with still further aspects of this invention, a preferred localized heating system embodiment is described as applied to an aircraft engine nacelle. The nacelle includes a lip region, a controlled surface located aft of the lip region, and an uncontrolled inner inlet surface. The heating system includes an electro-thermal heat source located within the nacelle and adapted to conduct heat to the lip region. The heating system further includes a heat pipe for transferring heat from the nacelle controlled surface to the nacelle uncontrolled inner inlet surface. The transfer of heat by the heat pipe encourages laminar flow along a nacelle controlled surface and thus improves nacelle boundary-layer airflow.

In accordance with still other aspects of this invention, the heat pipe includes a wicking and a vaporizing agent. The vaporizing agent is formed of a material such as ammonia or pentane and is provided to transfer heat between the hot and cold heat pipe regions. The electro-thermal heat source includes a high resistance wire embedded in a composite material.

In accordance with yet further aspects of this invention, a method of encouraging laminar flow about a controlled surface of an airfoil is provided, where the airfoil also includes a leading edge region and an uncontrolled surface located on the opposite side of the controlled surface. The method includes heating the airfoil leading edge region, drawing heat from the airfoil controlled surface that is located immediately downstream of the heated leading edge region, and expelling the drawn heat along the uncontrolled surface. In preferred embodiments, expelling heat includes expelling heat along a uncontrolled surface that is adjacent to turbulent air flow.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The inventors herein have determined that a sustained stabilization of the boundary-layer over an airfoil which has an adverse pressure gradient region can be effectively obtained by heating a localized airfoil leading edge region while enabling a simultaneous cooling of the adjacent downstream airfoil region. In particular, the inventors have discovered that significant benefits result when the cooling is accomplished by drawing heat from the downstream airfoil region and expelling the drawn heat on the opposite airfoil surface, preferably along an airfoil surface adjacent to air flow that is already turbulent.

The present invention is most applicable to airfoil structures having nearly two-dimensional flow, preferably having the only mode of boundary-layer instability being Tollmien-Schlichting waves (i.e., two-dimensional flow with no cross-flow instability). Example objects that may benefit from application of the present invention thereto include engine nacelles, low-sweep aircraft wings, low-sweep aircraft vertical tails, and the like. The description below describes features of the present invention as applied to a generally circular aircraft engine nacelle. Because there are numerous other environments within which the present invention may be applied, application to an engine nacelle should be considered illustrative and not limiting.

Figure 1:
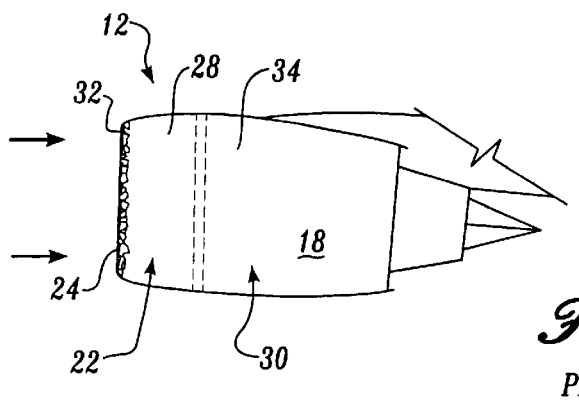
FIG. 1 is a side view of a prior art engine nacelle.
Figure 3:
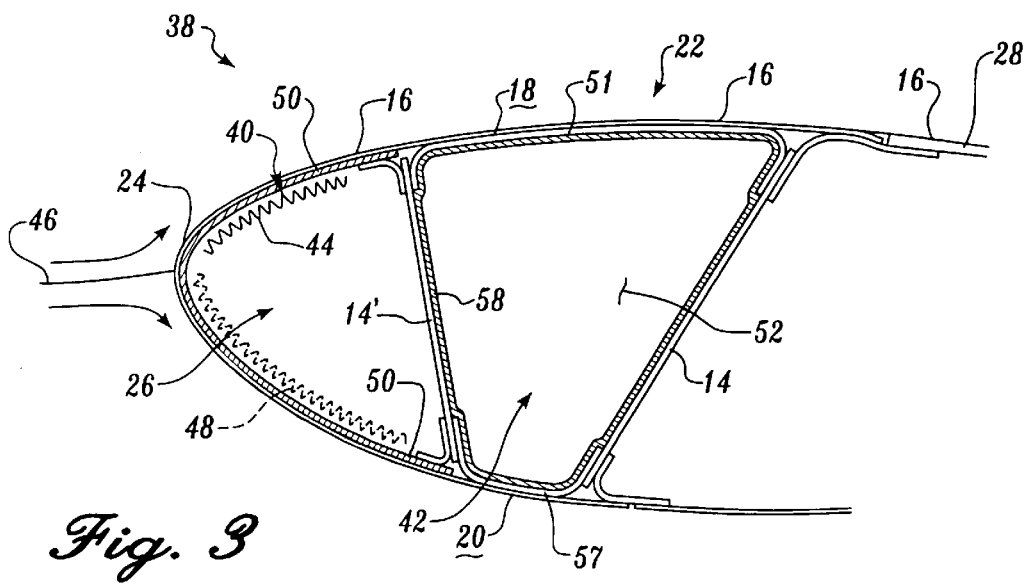
FIG. 3 is a detail cross-sectional side view of one embodiment of a heating apparatus formed in accordance with the present invention as applied to the engine nacelle of FIG. 2.

FIG. 1 shows a side view of a prior art generally circular turbofan aircraft engine nacelle 12. In turbofan engine nacelles, the region forward of the fan (not shown) is generally referred to as the inlet 22. The inlet includes a leading edge 24 that is located at the foremost surface of the inlet 22. A short region near the leading edge is referred to as a lip 26 (see FIG. 3) or leading edge region, which is followed by an inlet barrel 28. The structure aft of the inlet 22 is referred to as the fan cowl 30. Referring to FIG. 3, the region bounded by the inlet is referred to as a region of engine air intake.

Figure 2:
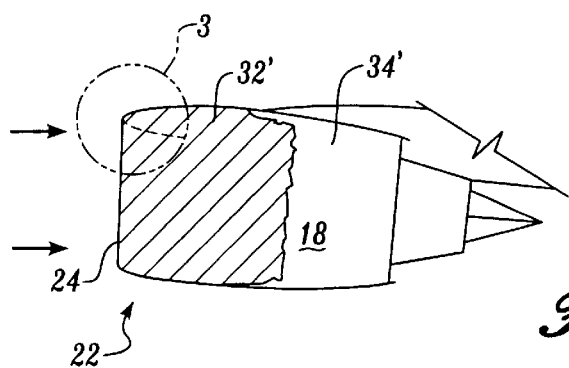
FIG. 2 is a side view of an engine nacelle within which a heating apparatus formed in accordance with the present invention is installed.

A shaded region labeled 32 is provided in FIG. 1 to illustrate the typical size and distribution of laminar flow that extends around the outer surface of the nacelle from the leading edge. As is shown, the shaded laminar flow region is mainly present only at the lip. Downstream of the laminar flow region, along the nacelle barrel 28, is a turbulent flow region 34. FIG. 2 illustrates the effect of using a heating system method and apparatus formed in accordance with the teachings of the present invention. As is shown, the improved laminar flow region 32' extends aftward from the nacelle leading edge a significant distance along the outer surface of the nacelle. The turbulent flow region 34' is correspondingly smaller.

A heating system formed in accordance with the present invention is generally applicable to aerodynamic shapes that include controlled and uncontrolled airfoil surfaces 18, 20. A controlled surface 18 is one over which a designer is attempting to affect the adjacent boundary layer. An uncontrolled surface 20 is one over which a designer may or may not be attempting to affect the adjacent airflow. As used with regard to the nacelle environment description herein, the controlled surface 18 is defined by the outer nacelle skin along the inlet barrel and fan cowl. The uncontrolled surface is provided by the exterior inlet skins that bound the inlet intake region.

One embodiment of a localized heating system 38 formed in accordance with the present invention for use with the nacelle of FIG. 1 is illustrated in FIG. 3. The system includes a heat source 40 located at the nacelle lip 26. The heat source 40 extends along a short length of the upper nacelle surface (relative to the orientation of FIG. 3) to cause the temperature of the adjacent lip airflow to increase. A heat sink 42 is positioned downstream of the heat source 40, adjacent to the controlled surface 18. The heat sink is adapted to draw heat from the controlled surface through the airfoil to the uncontrolled surface where the drawn heat is expelled into the adjacent inlet airflow. In this sense, the term "heat sink" as used herein means a device to transfer heat, and thus is a heat sink when viewed relative to the controlled surface.

Still referring to FIG. 3, the particular nacelle lip shown includes two annular structural members 14, 14'. Joining the circumferential ends of the first annular member 14, is a curved leading edge structure 50 and an optional outer skin 16 surrounding the leading edge structure 50. The outer skin 16 is helpful for achieving a smooth exterior airfoil surface, for limiting surface variations due to thermal stresses, and for protecting the airfoil surface from abrasion. The outer skin 16 is preferably formed of a thin metallic-type material (e.g., titanium, stainless steel).

Figure 4:
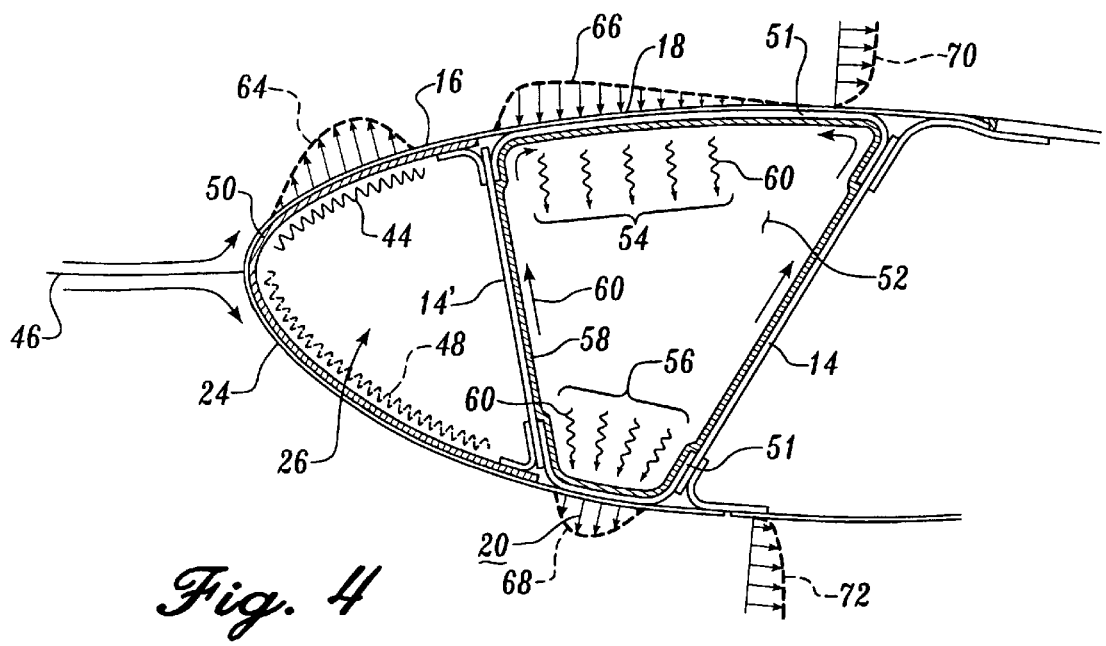
FIG. 4 is a detail cross-sectional side view illustrating various performance characteristics of the apparatus of FIG. 3.

In preferred embodiments, the heat source 40 is an electro-thermal heat source 44 located within the nacelle lip 26. The electro-thermal heat source 44 is embedded within the curved leading edge structure 50. The source 44 of FIGS. 3 and 4 is shown schematically as being outside of the structure 50 for the sake of illustrative clarity. The electro-thermal heat source 44 extends aftward from the leading edge along the upper portions (relative to FIGS. 3 and 4) of the leading edge structure 50, to the first structural member 14'. Electro-thermal heat sources are currently well known and as such are not discussed herein. In preferred embodiments, the electro-thermal heat source is a high resistance object, e.g., a conductor embedded in a leading edge structure formed of a composite material. The heat source is preferably powered using a dedicated generator, drawing power from an existing onboard system, or using engine bleed air.

Some current aircraft nacelles already include an electro-thermal heat source located within the forward region of the nacelle for use in thermal anti-icing (TAI) systems. If a particular airfoil application already includes TAI heating elements, it is preferable that the system be adapted so that heating above the anticipated stagnation streamline 46 can be accomplished independent of the heating below the stagnation streamline. A lower electro-thermal heat source 48 of a pre-existing TAI system is shown in phantom in FIGS. 3 and 4.

Still referring to the embodiment of FIG. 3, the heat sink 42 is a heat pipe 52 positioned within the nacelle aft of the electro-thermal heat source 44. Many types of heat pipes are well known and may be adapted for use with the present invention. The heat pipe of FIG. 3 is an annular pressurized area defined by the two annular structural members, the nacelle uncontrolled surface (i.e., the lower exterior skins relative to the orientation of FIG. 3), and the nacelle controlled surface (i.e., the nacelle upper exterior skins relative to the orientation of FIG. 3.) Because the area contains a vaporizing agent 60, additional seals may be used as necessary.

Referring to FIG. 4, the heat pipe 52 includes a warmer region 54 and a cooler region 56. The warmer region 54 is connected to the controlled surface 18 between the outer radial edges of the structural members 14, 14', immediately downstream of the electro-thermal heat source 44. The cooler region 56 is connected to the uncontrolled surface 20, between the inner radial edges of the structural members 14, 14'. The heat pipe 52 further includes a wicking material 58 that lines the interior surfaces of the annular area. Example wicking materials include aluminum, stainless steel, nickel, and carbon composite.

The area is additionally filled with a vaporizing agent 60, such as ammonia, pentane, or the like. During use, heat transfers from the warmer region 54 to the cooler region 56, effectively causing heat from the airflow adjacent to the controlled surface to transfer to the airflow adjacent to the uncontrolled surface. In general, the drawn heat is preferably expelled along an airfoil exterior surface at a location were the airflow is already turbulent in order to maximize efficiency of the apparatus.

As with most heat pipes, the warmer region heats the enclosed agent causing it to change phase into a vapor or gas. The vapor comes into contact with the cooler region and condenses into the wicking material. Because heat continues to move from warmer to cooler regions, the warmer region will continue to draw liquid to form vapor, and the vapor will continue to transfer heat to the cooler regions and condense back into a liquid. The wicking material then allows the liquid to flow back into the warmer region where the cycle is repeated. In effect, a type of rotating motion is caused within the enclosed area, where the vaporizing agent transfers heat from warmer to cooler regions of the airfoil. This motion is shown schematically by the vaporizing agent arrows within the heat pipe of FIG. 4.

Figure 5:
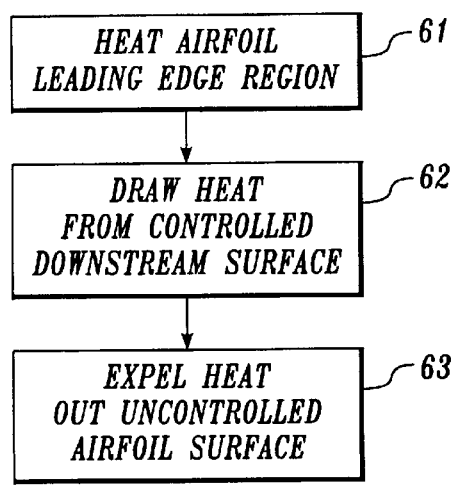
FIG. 5 is a schematic diagram showing an embodiment of a method of encouraging laminar flow formed in accordance with the present invention.

Shown in FIG. 5 is one embodiment of a method of encouraging laminar flow formed in accordance with the present invention. At step 61, the airfoil controlled surface leading edge region is heated. At step 62, heat is drawn from the controlled surface downstream of the heated region. At step 63, the drawn heat is expelled out the uncontrolled airfoil surface, preferably in a turbulent air flow stream. Although the illustration of FIG. 5 implies that these steps are done sequentially, it is preferred that all three activities occur concurrently and continuously.

FIG. 4 is a schematic representation of the method of FIG. 5 as applied to the nacelle of FIG. 3 and the effects this method has on the temperature and velocity of the airflow adjacent the nacelle exterior surfaces. After the electro-thermal heat source 44 is activated to heat the adjacent lining 50, heat flows outward into the nacelle controlled surface skins at the lip 26 and finally into the adjacent boundary-layer. This is illustrated in FIG. 4 at the first heat flux region labeled 64. The heated boundary-layer flows aftward toward the heat pipe 52. At the downstream location of the heat pipe, heat is transferred back into the nacelle controlled surface skins. This second heat flux region is labeled 66 in FIG. 4.

Still referring to FIG. 4, the heat energy in the downstream nacelle controlled surface skins causes nearby portions of the enclosed vaporizing agent 60 to evaporate. The evaporated agent moves to the cooler region 56 of the heat pipe where it condenses and is absorbed into the wicking material 58. The heat reaches the nacelle uncontrolled surface 20 where it transfers into the cooler adjacent inlet airflow. The third heat flux region is labeled item 68. The velocity profile of the laminar airflow is illustrated at item 70. The velocity profile of the turbulent airflow is illustrated at item 72.

As will be appreciated from the above, heat is conducted to the nacelle and convected away by the turbulent inlet boundary-layer flow, thereby maintaining a temperature decrease along the nacelle controlled surface as measured in traveling aft from the nacelle leading edge. Thus, the heating provided by the electro-thermal heat source has a beneficial effect on the boundary-layer. The heat pipe continues to transfer heat in this manner so long as the temperature at the nacelle uncontrolled surface is less than the surface boundary-layer temperature produced by the electro-thermal heat source and, more specifically, less than the controlled surface temperature downstream of the heat source.

In preferred embodiments, the heat source is located within the airfoil leading edge region where the adjacent local boundary-layer is stable (i.e., where the pressure gradient is not adverse) and hence will not amplify disturbances. Instead, any perturbations introduced by the heat source will have sufficient distance to decay prior to reaching a region of instability growth. Further, the heat sink is located to include a downstream region adjacent a boundary-layer that would otherwise be unstable (i.e., in the absence of the present invention.) In this manner, the present invention heating system continues to encourage laminar flow about an airfoil controlled exterior surface even though there may be appreciable heat transfer to the outer exterior surface in the stagnation region. To further help ensure that the inlet surface area aft of the lip is cooler than the local boundary-layer, it is preferable to not heat the nacelle lip area below the stagnation streamline, as it will degrade the overall performance by reducing the temperature differential between the controlled and uncontrolled surfaces.

Other types of heat sinks may be used. For example, other heat pipe configurations, solid metal, semiconductor cooling schemes based on Peltier effect, air conditioning, etc. In selecting a heat sink, it is important that the selected mechanism cause the controlled airfoil surface downstream of the heated region to be cooler than the heated boundary-layer so that there is heat transfer back into the airfoil. Additionally, the selected mechanism must dispose of the drawn heat in a timely manner so as to prevent the controlled surface from heating up and thus stopping the heat transfer from the boundary-layer flow.

An array of sensors (not shown) may be optionally provided at a location of about 50% chord to measure the state of the outer flow boundary-layer. If, for some reason, the flow is fully turbulent, the heat level can be increased to encourage more laminar flow or cut off to avoid wasting energy. Information about the state of the boundary-layer can also be used to correct performance estimates and guide maintenance scheduling.

As will be appreciated by those with skill in the art, the present invention method and apparatus may be used in a variety of airfoil applications to achieve an appreciable reduction in airfoil drag. The invention encourages laminar flow on airfoils in a manner that maintains conventional type $C_p$ distributions, and without the use of suction or its attendant disadvantages. A system formed in accordance with the present invention can increase laminar flow to reduce airplane drag, reduce direct operating costs, and save more energy than it takes to run the system. The present invention system is relatively easy to configure and maintain, and is light weight.

While particular embodiments of the invention have been illustrated and described in detail herein, it should be understood that various changes and modifications may be made to the invention without departing from the spirit and intent of the invention as defined by the scope of the appended claims.

The embodiments of the invention in which an exclusive property or privilege is claimed are defined as follows:

1. A heating system for encouraging laminar flow along an airfoil having a leading edge region, a controlled surface extending aftward from the leading edge region on one side of the airfoil, and an uncontrolled surface extending aftward from the leading edge region opposite the controlled surface, the heating system comprising:
   (a) a heat source located at the airfoil leading edge region; and
   (b) a heat sink positioned aft of the heat source and adapted for heat transfer from the controlled surface to the uncontrolled surface;
whereby the transfer of heat by the heat sink improves boundary-layer airflow along the controlled surface.

2. The heating system according to claim 1, wherein the airfoil includes a favorable pressure gradient region and the heat source extends within the airfoil an amount in the range of about 30% to about 80% of the favorable pressure gradient region.

3. The heating system according to claim 1, wherein the leading edge region includes a favorable pressure gradient region and the controlled surface includes an unfavorable pressure gradient region, the heat source being located in the favorable pressure gradient region and the heat sink being located to include at least portions of the unfavorable pressure gradient region.

4. The heating system according to claim 1, wherein the heat source is an electro-thermal heat source comprising a high resistance material embedded in a composite leading edge structure.

5. The heating system according to claim 1, wherein the heat sink is a heat pipe having a hot region and a cold region, the heat pipe hot region being in communication with the controlled surface downstream of the heat source, the heat pipe cold region being in communication with the uncontrolled surface.

6. The heating system according to claim 5, wherein the heat pipe cold region is in communication with the uncontrolled surface at a location that is adjacent turbulent air flow.

7. A localized heating system for encouraging laminar flow along a nacelle having a lip region, a controlled surface located aft of the lip region, and an inner inlet surface, the heating system comprising:
   (a) an electro-thermal heat source located within the nacelle and adapted to conduct heat to the nacelle lip region; and
   (b) a heat pipe having a hot region and a cold region, the heat pipe hot region being in communication with the controlled surface, and the heat pipe cold region being in communication with the nacelle inner inlet surface;
whereby the transfer of heat improves the boundary-layer airflow along the nacelle controlled surface.

8. The heating system according to claim 7, wherein the nacelle includes a favorable pressure gradient region and the electro-thermal heat source extends from the nacelle leading edge aftward over approximately 30%–80% of the favorable pressure gradient region.

9. The heating system according to claim 7, wherein the leading edge region includes a favorable pressure gradient region and the controlled surface includes an unfavorable pressure gradient region, the heat source being located in the favorable pressure gradient region and the heat sink being located to include at least portions of the unfavorable pressure gradient region.

10. The heating system according to claim 7, wherein the heat pipe cold region is in communication with the airfoil inner inlet surface at a location that is adjacent turbulent inlet air flow.

11. The heating system according to claim 7, wherein the nacelle is a generally circular nacelle having annular structural members and the heat pipe is an annular region bounded between the annular structural members.

12. The heating system according to claim 7, further including an outer skin located around the airfoil leading edge, the skin being formed from a material in the group comprising titanium and stainless steel.

13. The heating system according to claim 7, wherein the electro-thermal heat source includes a high resistance wire embedded in a composite material.

14. The heating system according to claim 7, wherein the heat pipe further includes a wicking material and a vaporizing agent.

15. A method of encouraging laminar flow about an airfoil having a leading edge region, a controlled surface extending aftward from the leading edge region on one side of the airfoil, and an uncontrolled surface extending aftward from the leading edge region opposite the controlled surface, the method comprising:

(a) heating the airfoil leading edge region;

(b) drawing heat from the airfoil controlled surface that is located immediately downstream of the heated leading edge region; and (c) expelling the drawn heat at the uncontrolled surface.

16. The method according to claim 15, wherein the leading edge region includes a favorable pressure gradient region and heating the airfoil controlled surface includes using an electro-thermal heat source that extends over approximately 30%–80% of the favorable pressure gradient region.

17. The method according to claim 15, wherein the leading edge region includes a favorable pressure gradient region and the controlled surface includes an unfavorable pressure gradient region; wherein heating the airfoil includes using a heat source located in the favorable pressure gradient region; and drawing the heat includes using a heat sink located in at least portions of the unfavorable pressure gradient region.

18. The method according to claim 15, wherein expelling heat includes expelling heat along an uncontrolled surface that is adjacent to turbulent air flow.

19. The method according to claim 15, wherein heating the airfoil controlled surface includes using an electro-thermal heat source having a high resistance wire embedded in a composite material.

20. The method according to claim 15, wherein drawing and expelling heat is accomplished using a heat pipe having a hot region and a cold region, the heat pipe hot region being in communication with the airfoil controlled surface, the heat pipe cold region being in communication with the uncontrolled surface.

\* \* \* \* \*